Patented Oct. 16, 1934

1,977,047

UNITED STATES PATENT OFFICE 1,977,047

SALTS OF KETO AROMATIC ACIDS

Lloyd C. Daniels, Crafton, and Alphons O. Jaeger, Mount Lebanon, Pa., assignors, by mesne assignments, to American Cyanamid & Chemical Corporation, a corporation of Delaware No Drawing. Application December 9, 1930, Serial No. 501,075

2 Claims. (Cl. 260—11)

This invention relates to nickel salts of keto aromatic acids, and more particularly to the nickel salts of mononuclear keto aromatic acids which have the structural formula

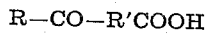

in which R is an aliphatic or a mononuclear aromatic group and R' is any aromatic group or, when R is aromatic, an aliphatic residue. The invention includes nickel salts of such acids, either substituted or unsubstituted, for example such substances as benzoylpropionic acid, acetobenzoic acid, chlorbenzoylbenzoic acid and the like; but compounds such as naphthoylbenzoic acid, in which R is polynuclear, are excluded.

The salts of the present invention may be prepared by reacting solutions of water-soluble nickel salts such as nickel nitrate, nickel chloride, nickel sulfate and the like with solutions of keto aromatic acids of the class defined, or preferably with solutions of their ammonium or alkali metal salts. When the free acid is to be used, and sometimes where a salt of the acid is to be reacted, it is desirable to include also an organic base such as pyridine, triethanolamine and the like, which serves to counteract the free acid present. The keto aromatic salt so formed is separated from the remaining solution by filtration, decantation, and the like, or by solution in an organic solvent which is not miscible with water, and may be obtained as such by washing and drying.

At present the chief use of these salts lies in the preparation of plastic and coating compositions, as described in the prior application of L. C. Daniels, Serial No. 476,715, filed August 20, 1930, but the present invention is not limited to any use to which the new products may be put.

Since nickel is a bivalent metal, it is possible to form further series of compounds in addition to those resulting from its reaction with a single mononuclear keto aromatic acid, for example mixtures of more than one keto aromatic acid of this class may be used in its preparation or mixtures of mononuclear keto aromatic acids with keto acids of other types, it being understood that in the preparation it is preferable to use a water-soluble salt of the acid rather than the acid itself. Similarly, the nickel may also be in combination with substances other than keto acids, for example it may be reacted simultaneously or successively with such substances as stearic acid, lactic acid, resin acids, and the like. This class of substances is particularly valuable in the preparation of resins where the nickel salts of mononuclear keto aromatic acids are to be used to add valuable properties to the resin or to impart coloring values thereto, since by combination of the nickel with other components of the resin a more uniform and stable product may be produced. It is quite possible that in some cases only unstable compounds may be produced in this manner or even mixtures of nickel salts, but as the chief use of the products is in solution or in admixture with a substance of extremely high molecular weight the net result is the same. The invention is not limited to compounds of nickel with a single mononuclear keto aromatic acid, but on the contrary every compound is included in which at least one mononuclear aromatic keto acid radical of the class defined is linked with nickel irrespective of whatever groups may also be linked to the metal.

The salts of the present invention exist in non-crystalline forms, most of them appearing when first prepared in the form of powders which have the light green color characteristic of nickel salts. They exhibit no sharp melting points and upon heating many of them gradually soften and become plastic without decomposition, and all are characterized by relatively good solubility in most of the organic solvents commonly used. They also possess the extremely important characteristic of all heavy metal salts of keto acids of forming tough and resistant films upon evaporation of their solutions in organic solvents, either in the presence or absence of plasticizers.

The preparation and use of representative salts of the present invention will be described more specifically in the following examples, but the invention is not limited thereto.

Example 1

Benzoylpropionic acid is prepared by the reaction of 140.5 parts by weight of benzol, 53.4 parts of aluminum chloride and 20 parts of succinic anhydride, the reagents being brought into intimate admixture at temperatures below 15° C. and heated at 50° C. during 2-3 hours. The product is poured into dilute ammonia, the excess benzol distilled off with steam, the free acid liberated and purified with decolorizing carbon if necessary, and the ammonium salt again formed by the addition of equivalent amounts of dilute ammonium hydroxide.

The acid so obtained is mixed with pyridine, triethanolamine or other organic base and transformed into the nickel salt by the addition of an aqueous solution of nickel nitrate. The insoluble salt so formed is filtered off and dried, taken up in alcohol or acetone, and may be used in the preparation of coating compositions such as cellulose lacquers to form a colored film.

*Example 2*

Benzoylbenzoic acid is prepared by mixing 200 parts of phthalic anhydride, 380 parts of aluminum chloride and 792 parts of benzol at low temperatures, raising the temperature to 40–50° C., heating at this point for one hour and refluxing for an additional hour. The product is poured into a solution of 280 parts of Na₂CO₃, excess benzol removed by steam distillation and the free acid liberated with dilute hydrochloric acid. The purified acid so obtained is treated with sufficient dilute ammonia to form the ammonium salt after which the nickel salt is prepared by adding equivalent amounts of a solution of nickel nitrate. The product so obtained is separated on a filter, washed and dried, and dissolved in acetone and admixed with a solution of cellulose nitrate in solvents such as amyl acetate, "Pentacetate" or other suitable solvent together with such plasticizers as diethyl phthalate, butyl benzoylbenzoate and the like. The resulting lacquer can be used for the preparation of light green films or can be further colored by the addition of solutions of dyes which will form a colored lake with the nickel.

What is claimed as new is:

1. Nickel salts of mononuclear keto aromatic acids having the formula $$(R-CO-R'COO)_2Ni$$

in which R is a mononuclear aromatic group and R' is aliphatic.

2. Nickel benzoylpropionate.

LLOYD C. DANIELS.
ALPHONS O. JAEGER.